United States Patent [19]

Troester

[11] Patent Number: 4,680,985
[45] Date of Patent: Jul. 21, 1987

[54] CONTINUOUSLY VARIABLE TRANSMISSION WITH EPICYCLIC CONSTANT MESH GEARING

[76] Inventor: Thomas F. Troester, 16561 Barryknoll Way, Granger, Ind. 46530

[21] Appl. No.: 790,427

[22] Filed: Oct. 23, 1985

Related U.S. Application Data

[63] Continuation-in-part of Ser. No. 652,497, Sep. 19, 1984, abandoned, which is a continuation-in-part of Ser. No. 367,299, Apr. 12, 1982, abandoned.

[51] Int. Cl.$^4$ ............................................... F16H 3/50
[52] U.S. Cl. ........................................ 74/785; 74/191; 74/394; 74/461; 74/796
[58] Field of Search ................. 74/212, 191, 349, 393, 74/394, 594.2, 625, 626, 777, 785, 793, 796, 797, 798, 799, 750 B, 461

[56] References Cited

U.S. PATENT DOCUMENTS

| | | | |
|---|---|---|---|
| 667,062 | 1/1901 | Clemens | 74/625 X |
| 1,150,087 | 8/1915 | Williams | 74/348 |
| 1,484,197 | 2/1924 | Stefani | 74/349 |
| 2,066,758 | 1/1937 | Bassoff | 74/793 |
| 2,171,993 | 9/1939 | Reichelt | 74/796 |
| 2,203,635 | 6/1940 | Schmitter | 74/796 |
| 2,275,243 | 3/1942 | Bade | 74/796 |
| 2,335,504 | 11/1943 | Gazda | 74/461 X |
| 2,553,465 | 5/1951 | Monge | 74/626 |
| 2,970,494 | 2/1961 | Lynch | 74/349 X |

FOREIGN PATENT DOCUMENTS

| | | | |
|---|---|---|---|
| 777283 | 2/1935 | France | 74/349 |
| 570192 | 6/1945 | United Kingdom | 74/461 |

Primary Examiner—Leslie Braun
Assistant Examiner—Dwight G. Diehl
Attorney, Agent, or Firm—James D. Hall

[57] ABSTRACT

A gear driven continuously variable transmission including an epicyclic cone in mesh with an axially slidable nonrotating ring gear. The cone and ring gear are enclosed in a housing. An input shaft is journaled in the housing. The cone revolves about the axis of the shaft as it rotates on its own axis and is connected to the shaft to convert axial rotation of the input shaft into rotation of an output gear. The ring gear is slidable axially relative to the shaft, and the output gear ratio is varied by the axial position of the slidable ring gear.

2 Claims, 11 Drawing Figures

CONTINUOUSLY VARIABLE TRANSMISSION WITH EPICYCLIC CONSTANT MESH GEARING

CROSS-REFERENCE TO RELATED APPLICATION

This is a continuation-in-part of application Ser. No. 652,497 filed Sept. 19, 1984, now abandoned which is a continuation-in-part of application Ser. No. 367,299 filed Apr. 12, 1982, now abandoned.

BACKGROUND OF THE INVENTION

This invention relates to a transmission having specific application to a bicycle or moped but is not intended to be so limited. Other applications may include automotive or industrial speed change devices.

Present mopeds generally have two sources of powers:
1. An engine, and
2. Pedals operated by the rider.

When propelled by the engine a moped has either no transmission, a two-speed centrifugal clutch-actuated transmission, or a variable diameter belt pulley. When propelled by the pedaling of the operator there is normally no change of gear ratios available on the present mopeds. It is the purpose of this invention to provide a continuously variable gear ratio in either the engine or pedaling mode.

SUMMARY OF THE INVENTION

The continuously variable transmission of this invention includes a housing and an input shaft journaled in the housing. The housing has a ring gear which is slidable axially relative to the axis of the shaft. A cone having a geared surface is positioned within the housing and meshes at its geared surface with the ring gear. The cone is connected at one end to the shaft such that it travels about the shaft in meshing contact with the ring gear as the cone rotates about its own axis. The other end of the cone is in gear contact with an output gear to cause rotation of the output gear in response to rotation of an input shaft connected to an energy source. The output speed may be varied according to a transmission ratio determined by the axial position of the ring gear. The surface of the cone is formed into selectively located helical teeth for moving line contact with the ring gear.

Accordingly, it is an object of this invention to provide a novel and useful continuously variable transmission which produces a gear ratio which changes through a zero ratio to any theoretical ratio.

Another object of this invention is to provide a continuously variable transmission which includes a cone having a specific gear surface.

Another object of this invention is to provide a continuously variable transmission which includes a housing having an input shaft journaled in the housing and a cone which rotates about the axis of the shaft.

Other objects of this invention will become apparent upon a reading of the following description.

DESCRIPTION OF THE PREFERRED EMBODIMENTS

The preferred embodiments illustrated are not intended to be exhaustive or to limit the invention to the precise forms disclosed. They are chosen and described in order to explain the principles of the invention and its application and practical use to thereby enable others skilled in the art to utilize the invention.

Figure 1:
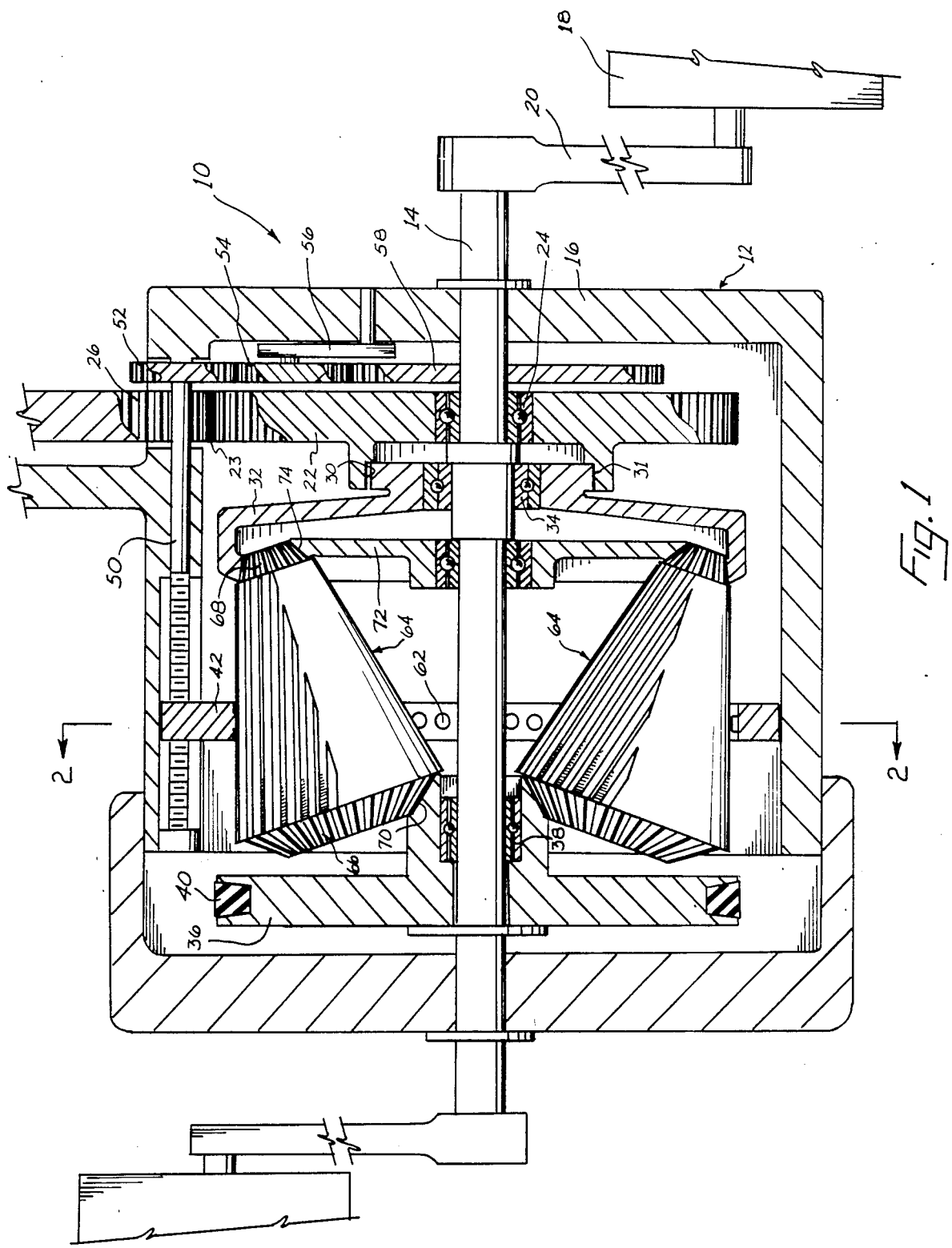
FIG. 1 is a sectional view taken along the shaft of the transmission.

The embodiment of the continuously variable transmission 10 of this invention is shown in FIG. 1. Transmission 10 includes a housing 12 and a shaft 14 journaled adjacent its ends in side walls 16 of the housing. A pedal 18 is connected to each end of shaft 14 by a crank arm 20 such that a rotational force exerted on the pedals causes axial rotation of the shaft.

A drive gear 22 is carried on shaft 14 and does not rotate with the shaft due to the anti-friction type bearing 24 which mounts the gear on the shaft. Drive gear 22 is in mesh at gear teeth 23 with a motor-driven gear 26 which is connected to a motor through a centrifugal clutch 28. Gear 22 has internal teeth 30 which mesh with teeth 31 of a second drive gear 32. Gear 32 is carried on shaft 14 and is mounted thereon by a one-way clutch 34 which permits rotation of gear 32 with the shaft unless the gear is being rotated faster than the shaft by drive gear 22. Together drive gears 22 and 32 constitute an eccentric gear set whose inherent high reduction ratio reduces the motor input revolutions per minute to a rate comparable to the revolutions per minute of crank 20. An output gear 36 is also mounted on shaft 14 by an anti-friction type bearing 38 which permits free rotation of the output gear relative to the shaft. Output gear 36 is preferably of the pulley type which is connected to the drive wheel of a moped by a belt 40.

Figure 2:
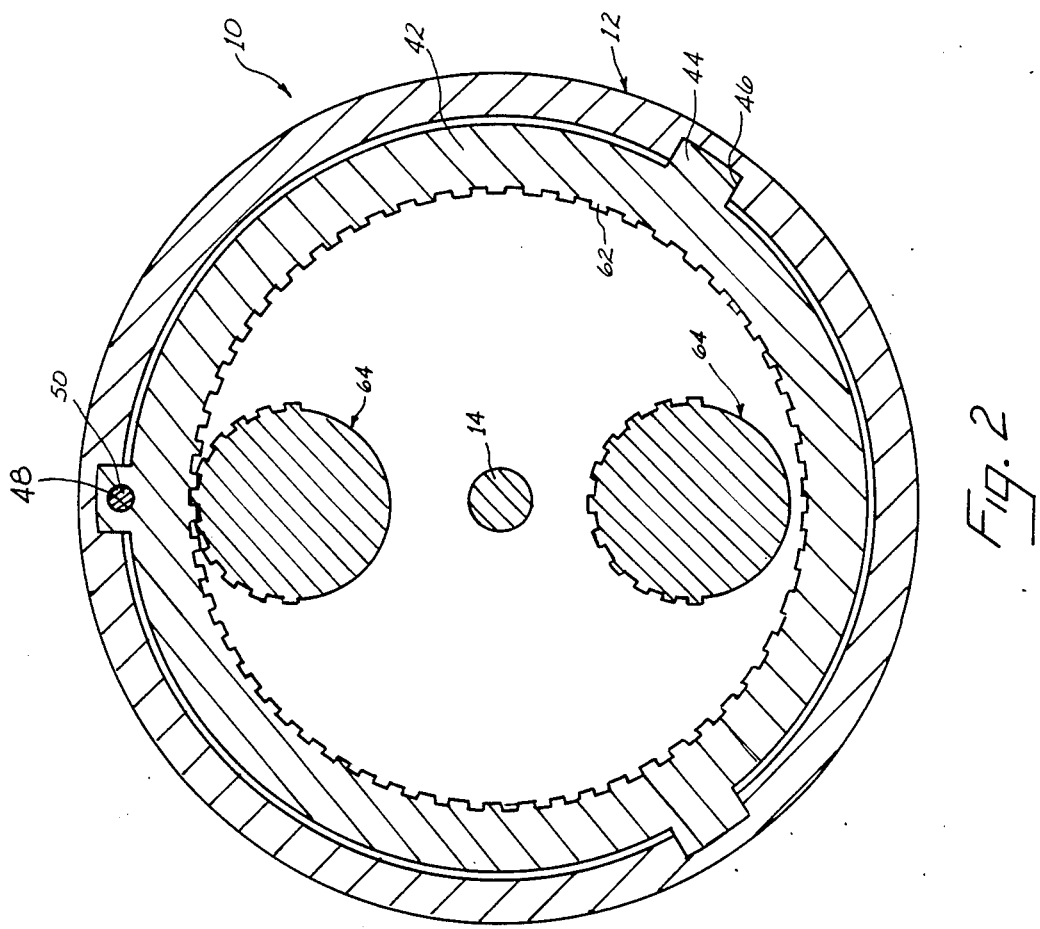
FIG. 2 is a sectional view taken along line 2—2 of FIG. 1.
Figure 3:
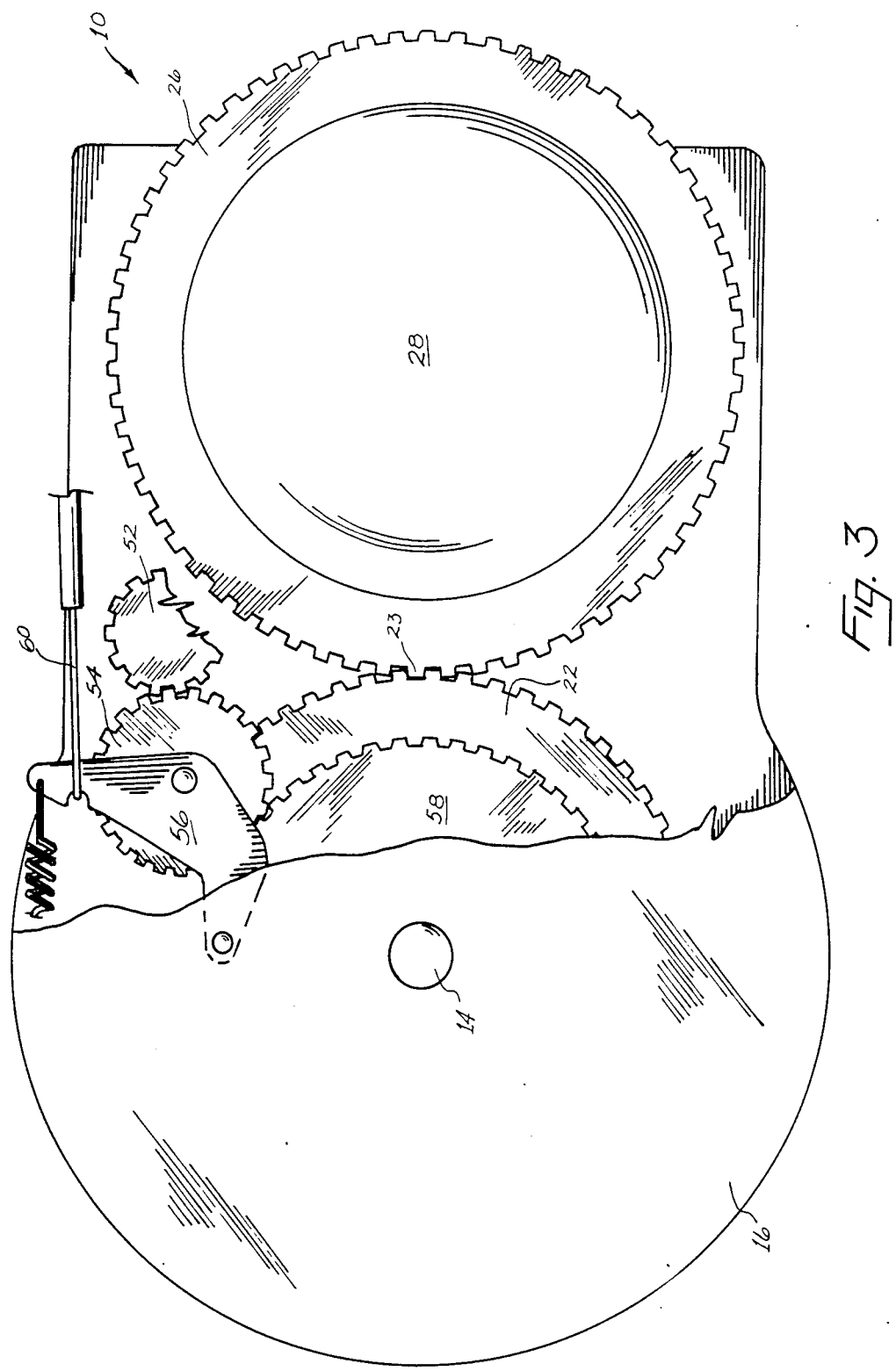
FIG. 3 is a side view of the transmission with portions of the housing broken away for purposes of illustration.
Figure 4:
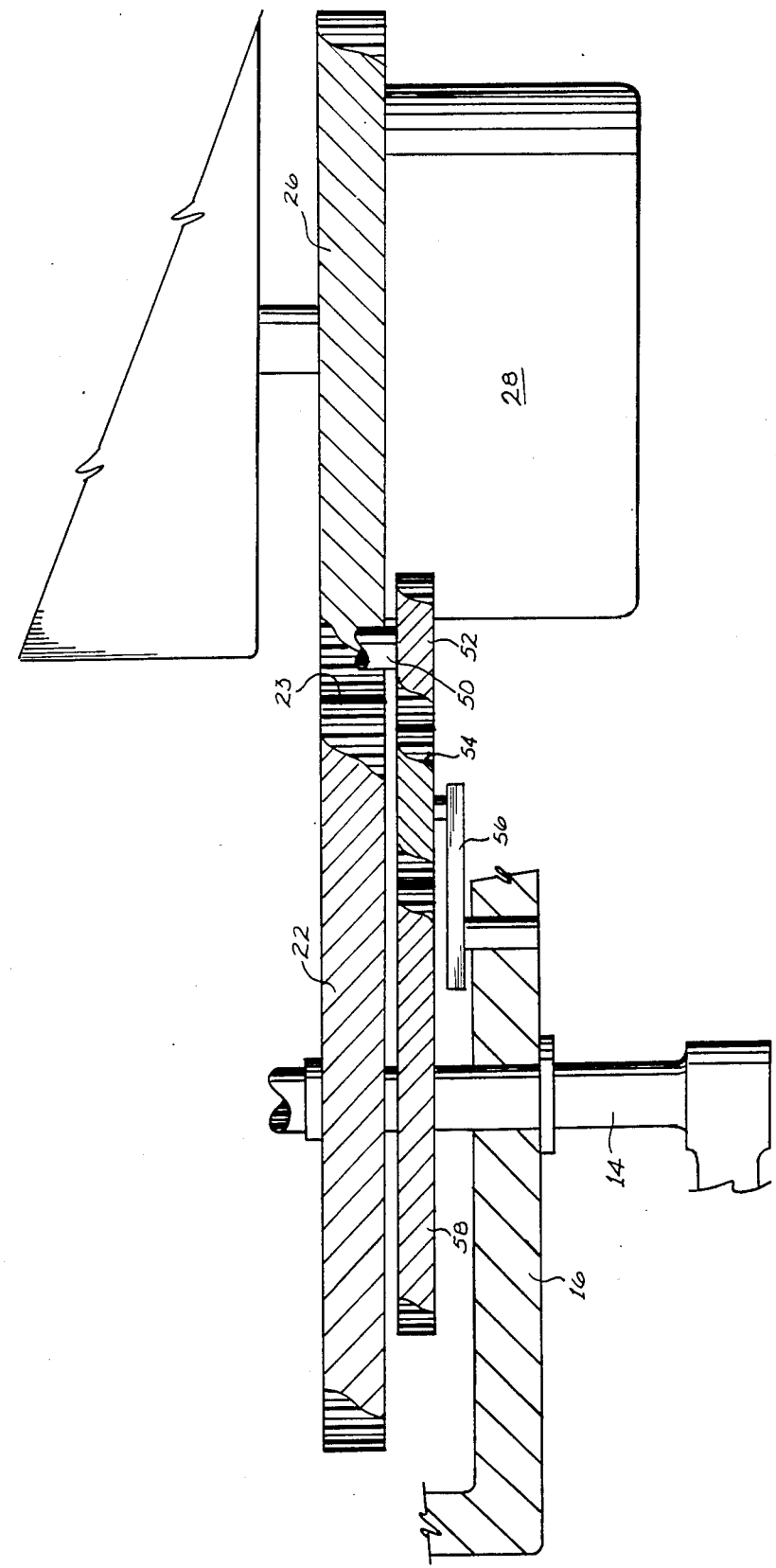
FIG. 4 is a top view of the input gear portion of the transmission.

A ring gear 42 is mounted in housing 12, as shown in FIG. 2. Rotation of ring gear 42 is prevented by one or more dogs 44 or tabs which fit into grooves 46 in housing 12. One or more of dogs 44 is provided wth internal screw threads 48. A threaded rod 50 having a gear 52 attached at one end is threaded into dog 44 having internal threads 48. Rod 50 is restrained from axial movement. A gear 54 is connected to a pivoting link 56. A gear 58 is mounted on shaft 14 and rotates with the shaft. Link 56 moves gear 54 into and out of mesh with gears 52 and 58. Shifting of gear 54 is accomplished with thumb lever or similar arrangement connected to link 56 by a cable 60. When gear 54 is engaged between gears 52 and 58, rotation of shaft 14 as by pedaling will cause rotation of rod 50 and movement of ring gear 42 within grooves 46 axially relative to the shaft. Ring gear 42 has gear teeth 62 which are preferably circular in cross section, as shown in FIG. 1.

Each of gear cones 64 meshes with ring gear teeth 62. Cones 64 have gear teeth 66 and 68 at their base and apex respectively. Base gear teeth 66 are in mesh with gear teeth 70 of output gear 36 and apex gear teeth 68 are in mesh with drive gear 32. An idler 72 is mounted on shaft 14 and has gear teeth 74 at its outer circumference which mesh with cone apex teeth 68 such that the cone apex teeth are positioned between the idler and the drive gear 32 and supported by the idler. Output gear 36 may be of the type shown wherein it meshes with cone base teeth 66 at an inner point on the surface diameter of cones 64 or it may be of a type such as drive gear 32 where it would mesh with the cone base teeth at an outer point of the surface diameter of the cones. Cones 64 are equal angularly positioned about the axis of shaft 14.

Figure 5:
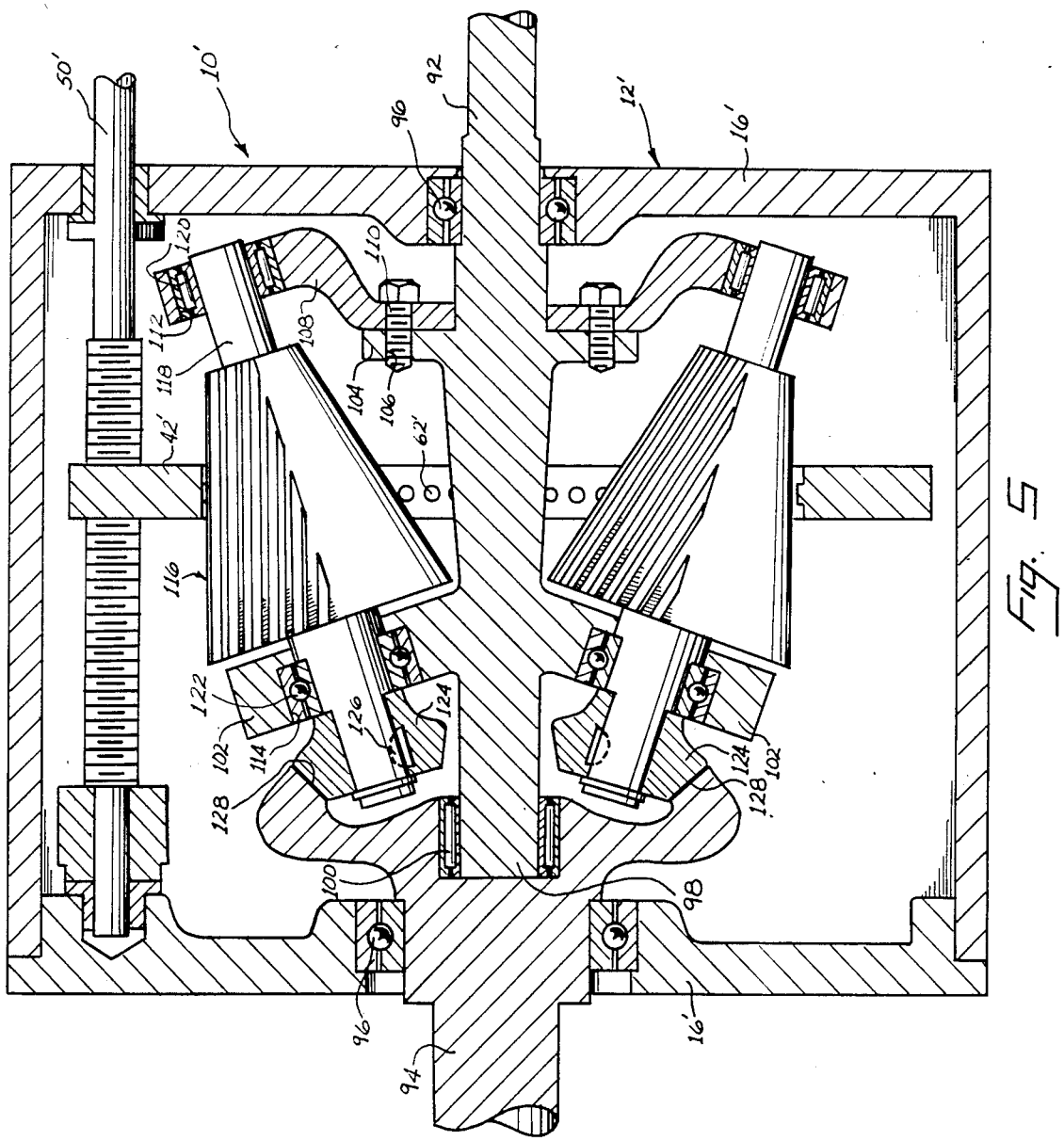
FIG. 5 is a sectional view of a second embodiment of the invention.
Figure 6:
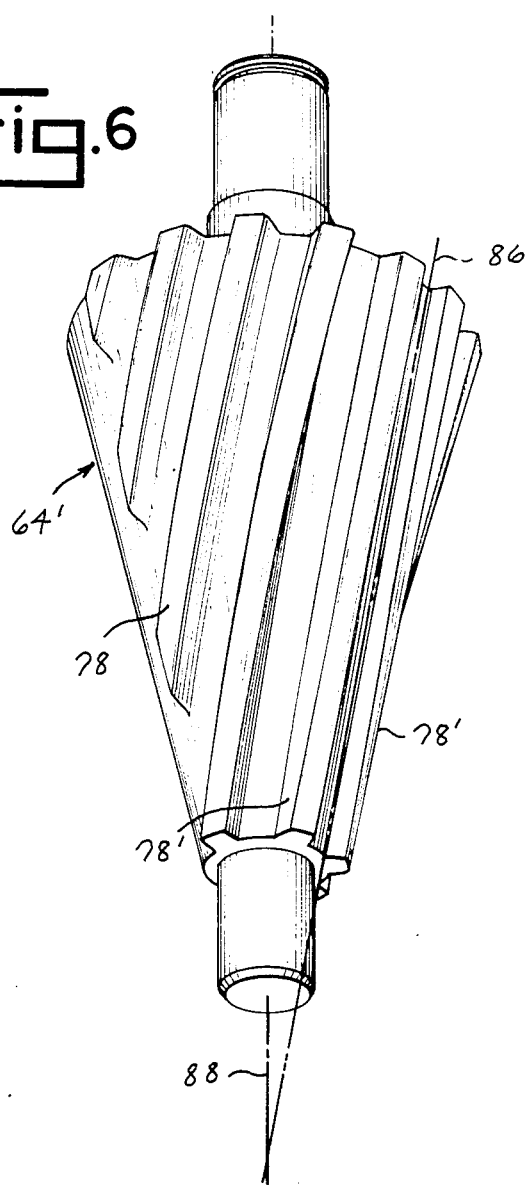
FIG. 6 is a perspective view of a cone.
Figure 7:
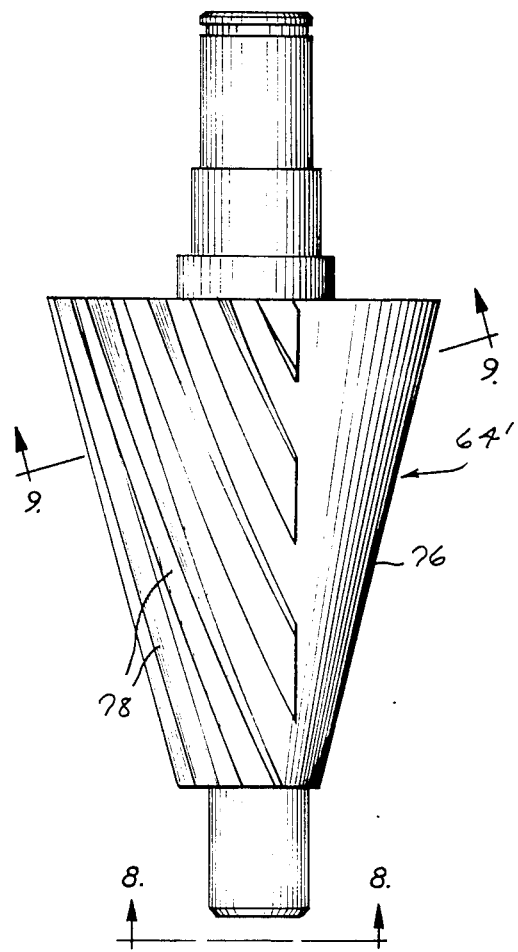
FIG. 7 is a side view of the cone of FIG. 6.
Figure 9:
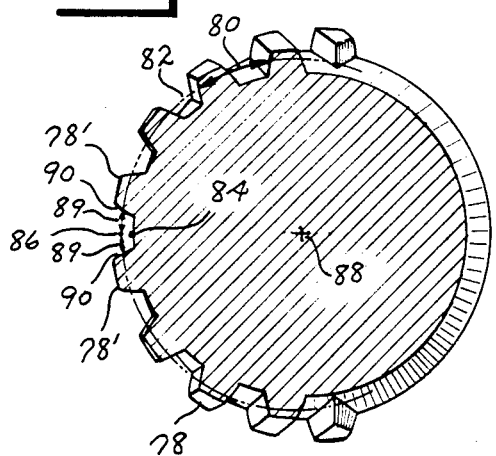
FIG. 9 is a sectional view taken along line 9—9 of FIG. 7.
Figure 8:
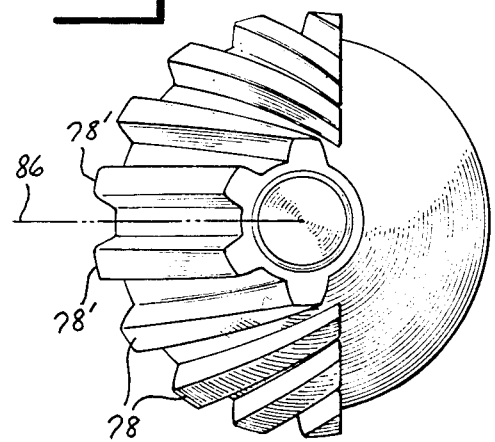
FIG. 8 is an end view of a cone seen from line 8—8 of FIG. 7.

A second embodiment of the transmission is shown in FIG. 5. Transmission 10' includes a housing 12' having side walls 16'. An input shaft 92 is journaled in one side wall 16' by bearings 96 which are preferably of the ball type, and an output shaft 94 is journaled in a second side wall 16'. It is also journaled with bearings 96, preferably of the ball type. Input shaft 92 is journaled at one end 98 in the body of output shaft 94 with bearings 100, preferably of the needle roller type. A first pair of arms 102 extend radially outwardly from input shaft 92 and are angled transversely to the axis of the input shaft. Arms 102 are oppositely spaced upon the input shaft 92. Input shaft 92 also includes a flange member 104 having openings 106 formed in the flange and spaced radially about the input shaft. Arms 108 project from input shaft 92 and are attached to flange 104 with bolts 110, or similar fastening devices, threaded into openings 106. Arms 108 are radially oppositely spaced about input shaft 92. Each arm 108 has an opening 112 formed therein and which is aligned with a similar opening 114 in each arm 102. Cones 116, having a geared surface similar to that of cones 64 of the first described embodiment of the transmission shown in FIGS. 1-4, include a shaft 118. Shaft 118 fits within opening 12 in arm 108 such that cone 116 is mounted with its base adjacent arm 102 and its frustum adjacent the other arm 108. Shaft 118 is journaled within opening 112 by bearings 120, preferably of the needle roller type, and is journaled in opening 114 by bearings 122, preferably of the ball type. A ring gear 42' including controlled deflectable teeth 62' is mounted within housing 12' in a manner similar to that described in the first embodiment, and engages each gear cone 116 at its geared surface when the gear cones are mounted about input shaft 92 as described. In this manner ring gear teeth 62' mesh with cone gear teeth 78.

Ring gear 42' is shiftable axially relative to input shaft 92 through rotation of a rod 50' which is threadedly engaged with the ring gear 42'. Each shaft 118 mounts a gear 124 adjacent output gear 94. Gear 124 is keyed to shaft 118 at 126. Gear 124 meshes with output gear 94 at 128 to cause rotation of the output gear upon rotation of input shaft 92. It should be understood that an input source may be connected to shaft 94 thus converting shaft 92 to an output shaft. The ratio of speed of rotation of input shaft 92 to output shaft 94 is varied by shifting ring gear 42' axially relative to input shaft 92. The ratio is variable through a zero ratio to any theoretical ratio, which includes reverse rotation.

In FIGS. 6-9 a preferred embodiment of each gear cone 64' is shown. Each cone 64' has a right circular conical surface 76 upon which are formed parallel helical teeth 78. The pitch 80 of teeth 78 at each generally oval pitch line 82 (only one shown) of the gear cone 64' are equal. Each pitch line 82 is measured in the plane formed at a right angle or normal to a straight line 84 forming a part of cone surfce 76 which passes through the vertex and directrix of the surface. Such pitch line plane is also normal to the axis of rotation of the gear drive (or driven) shaft 92. The pitch lines are proportional but will vary in size as the diameter of the gear cone varies. The addendum of the teeth 78 along each pitch line are equal.

For the group of teeth 78 of each gear cone 64' there is a centered linear reference 86 which extends between two adjacent teeth 78' and intersects each pitch line 82 of the gear cone and the axis 88 of rotation of the cone. The arcuate distance 89 along each pitch line 82 from reference 86 to the opposing flanks 90 of teeth 78' is always the same.

Figure 10:
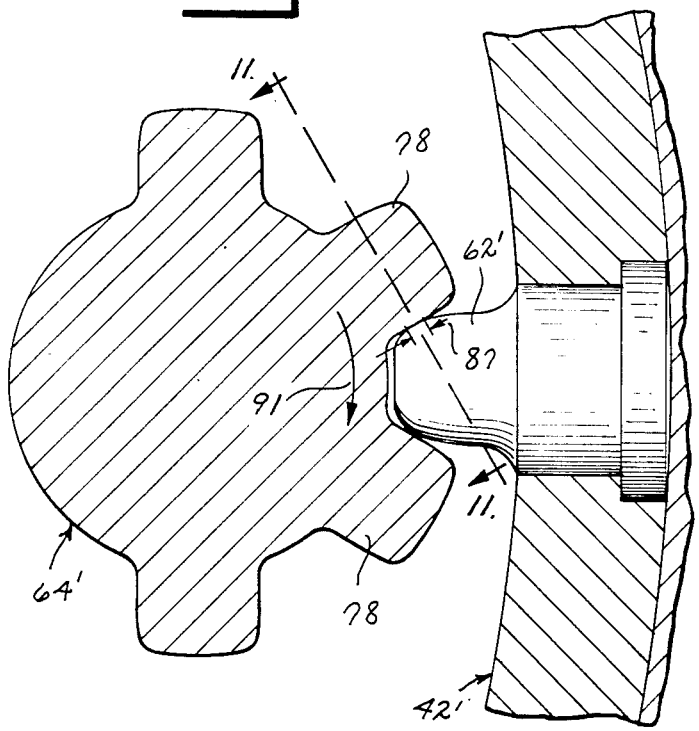
FIG. 10 is an enlarged fragmentary sectional view of the cone of FIG. 6 shown engaging a ring gear tooth.
Figure 11:
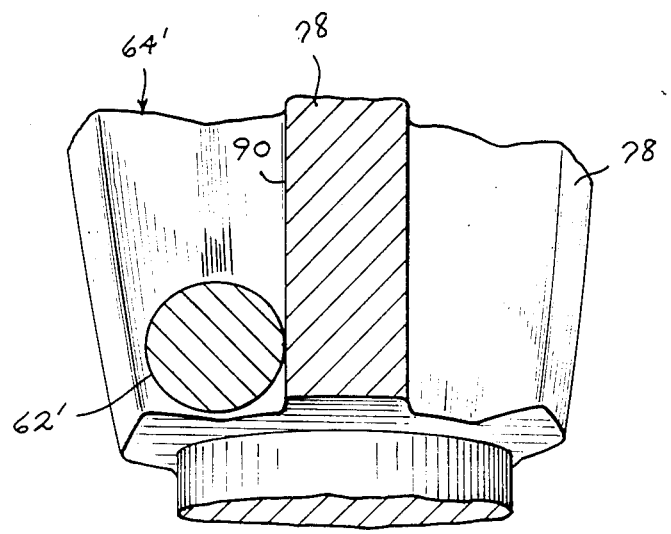
FIG. 11 is a fragmentary sectional view taken along line 11—11 of FIG. 10.

In FIGS. 10 and 11 the mesh of a ring gear tooth 62' with a gear cone tooth 78 is shown in detailed form. With the rotation of cone 64' shown in the direction of arrow 91, each tooth 62' will make initial point contact at the pitch line followed by line contact 87 through elastic deformation of the ring gear tooth along the flank 90 in a root to tip direction of the contacting cone tooth 78. This point or line contact along the cone tooth flank in a root to tip direction is contrary to normal gear practice where gear line contact is across the tooth and is desirable to produce a maximum gear efficiency for this type transmission. This line contact is accomplished by the above mentioned planned elastic deformation of the ring gear tooth and the length of the line contact is proportional to the torque being transmitted by cone 64'. The cross-sectional configuration of each tooth 62' is preferably circular. The aforedescribed teeth for gear cone 64' and ring gear 42' apply equally to the transmission embodiment of FIGS. 1-4 and will not be repeated.

It is to be understood that the invention is not to be limited by the terms of the above description but may be modified within the scope of the appended claims.

I claim:

1. A continuously variable transmission comprising a housing, an input shaft, said input shaft journaled in said housing, a nonrotatable ring gear mounted in said housing, means for shifting said ring gear axially relative to said input shaft, an output gear, a gear cone having an outer conical surface including teeth meshing with said ring gear and a base, said cone including teeth adjacent to the base of said conical surface in mesh with said output gear, and means for connecting said cone to said input shaft whereby rotation of the input shaft is converted into rotation of said output gear and said ring gear is shiftable axially to vary the ratio of rotation of said input shaft and said output gear, said means connecting said cone to said input shaft including a first input gear rotatably mounted on the input shaft and in mesh with one end of the cone, idler means rotatably mounted on said input shaft for supporting said cone one end in meshing contact with said first input gear whereby rotation of said input shaft causes rotation of said cone, said means connecting said cone to said input shaft including means for providing an alternate power source of rotation of said cone, said alternate rotative source means including a second input gear mounted on said input shaft and adapted to rotate in response to said alternative power source, reduction gear means for connecting said first and second input gears, clutch means mounting said first input gear on said input shaft for making the first input gear nonresponsive to rotation of the input shaft when said second input gear causes the first input gear to rotate at a higher speed of rotation than the input shaft.

2. In a continuously variable transmission including an epicyclic cone in mesh with an axially slidable nonrotatable ring gear, said transmission including a housing, a first shaft and a second shaft each journaled in and said housing, the ring gear having teeth and being mounted in said housing, means for shifting said ring gear axially relative to said first shaft, said second shaft including a first gear, a plurality of gear cones, each gear cone having an outer right circular conical surface and including teeth thereon located within pitch lines of the cone and adapted to mesh with said ring gear teeth, each gear cone including a part in mesh with said first gear, said gear cones being rotatably carried by said first shaft and equal angularly positioned about the axis of rotation of said first shaft whereby rotaton of one of said first and second shafts causes rotation of the gear cones relative to the ring gear and resulting rotation of the other of said first and second shafts, said ring gear being shiftable axially to vary the ratio of rotation of said first and second shafts, the improvement wherein the pitch lines of each gear cone are located in parallel planes normal to said conical surface of the gear cone along a line extending through the vertex and directrix of the surface and are of varying proportional sizes, the pitch of said teeth of each gear cone being equal in any one of said pitch lines, said ring gear teeth each constituting deflectable means for accommodating line contact with a said cone tooth in a radial direction along the flank of said contacting ring gear tooth in a tip-to-root direction of the ring gear teeth and a corresponding root-to-tip direction of the cone tooth.

* * * * *